United States Patent
Jain et al.

(10) Patent No.: US 10,169,069 B2
(45) Date of Patent: Jan. 1, 2019

(54) SYSTEM LEVEL UPDATE PROTECTION BASED ON VM PRIORITY IN A MULTI-TENANT CLOUD ENVIRONMENT

(71) Applicant: International Business Machines Corporation, Armonk, NY (US)

(72) Inventors: Chethan Jain, Bangalore (IN); Manjunatha H R, Bangalore (IN); Maria R. Ward, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/481,339

(22) Filed: Apr. 6, 2017

(65) Prior Publication Data

US 2018/0293093 A1   Oct. 11, 2018

(51) Int. Cl.
  *G06F 9/455*  (2018.01)
  *H04L 29/08*  (2006.01)

(52) U.S. Cl.
  CPC .......... *G06F 9/45558* (2013.01); *H04L 67/10* (2013.01); *G06F 2009/4557* (2013.01)

(58) Field of Classification Search
  CPC .... G06F 9/4881; G06F 9/505; G06F 11/1461; G06F 2209/5019; G06F 8/65; G06F 9/4843; G06F 9/542
  See application file for complete search history.

(56) References Cited

U.S. PATENT DOCUMENTS

| | | | |
|---|---|---|---|
| 6,834,386 B1 * | 12/2004 | Douceur | G06F 9/4881 718/102 |
| 8,078,824 B2 | 12/2011 | Sugumar et al. | |
| 8,484,653 B2 | 7/2013 | Tsirkin | |
| 8,725,995 B1 | 5/2014 | Kim et al. | |
| 8,793,428 B2 | 7/2014 | Ali et al. | |
| 8,892,699 B2 | 11/2014 | Mann | |
| 8,935,704 B2 | 1/2015 | Da silva et al. | |
| 8,997,048 B1 | 3/2015 | Pomerantz et al. | |
| 9,189,436 B2 | 11/2015 | Browning et al. | |
| 2008/0154805 A1 * | 6/2008 | Gurumoorthy | G06F 8/65 706/12 |

(Continued)

OTHER PUBLICATIONS

Zhang et al.; "Cloudvisor: . . . of Virtual Machines in Multi-Tenant Cloud With Nested Virtualization", SOSP'11 ACM 23th Inter. Symp. on, Oct. 23-26, 2011, pp. 203-216.

(Continued)

*Primary Examiner* — Dong U Kim
(74) *Attorney, Agent, or Firm* — Patterson + Sheridan, LLP (57) ABSTRACT

Embodiments include systems, methods, and computer program products to perform an operation for managing system activities in a cloud computing environment. The operation generally includes determining a type of system activity to perform on one or more servers in the cloud computing environment. The operation also includes identifying a set of locking parameters available for restricting system activity on the one or more servers. Each locking parameter corresponds to a different type of system activity. The operation further includes determining whether to perform the type of system activity based on a value of a locking parameter of the set of locking parameters associated with the type of system activity.

20 Claims, 8 Drawing Sheets

(56) References Cited

U.S. PATENT DOCUMENTS

| | | | |
|---|---|---|---|
| 2009/0113435 A1* | 4/2009 | Mizrachi | G06F 11/1461 718/102 |
| 2010/0153945 A1* | 6/2010 | Bansal | G06F 9/4881 718/1 |
| 2014/0115588 A1 | 4/2014 | Traut et al. | |
| 2014/0237476 A1* | 8/2014 | Steffen | G06F 9/505 718/103 |
| 2014/0331228 A1 | 11/2014 | Barrat et al. | |
| 2014/0372739 A1 | 12/2014 | Arroyo et al. | |
| 2015/0066813 A1* | 3/2015 | Andreatta | G06F 9/505 706/11 |
| 2016/0253211 A1 | 9/2016 | Franco et al. | |
| 2017/0357529 A1* | 12/2017 | Venkatraman | G06F 9/4881 |

OTHER PUBLICATIONS

Jhawar et al.; "Fault Tolerance Management in Cloud Computing: A System Level Perspective", IEEE Systems Journal, vol. 7, No. 2, Jun. 2013, pp. 288-297.

Troger et al.; "Software-Implemented Fault Injection At Firmware Level", DEPEND IEEE Third International Conference on, Jul. 18-28, 2010, pp. 13-16.

Denneman, Frank, "Disable vMotion for a Single VM," Aug. 18, 2014, Accessed Apr. 4, 2017, Available Online, http://frankdenneman.nl/2014/08/18/disable-vmotion-single-vm/.

vmware.com, "Ensuring Virtual Machines Stay on a Specific ESX/ESXI Host (1005508)," Accessed Apr. 6, 2017, Available Online.

Gabes Virtual World, "How to Pin a VM to a Single Host and Still Be Able to Enter Maintenance Mode," Feb. 24, 2011, Accessed Apr. 6, 2017, Available Online, http://www.gabesvirtualworld.com/how-to-pin-a-vm-to-single-host-and-still-be-able-to-enter-maintenance-mode/.

IBM Knowledge Center, "IBM AIX Dynamic System Optimizer," Accessed Apr. 6, 2017, Available Online, https://www.ibm.com/support/knowledgecenter/ssw_aix_61/com.ibm.aix.optimize/dso_dso.htm.

Toolbox.com "Upgrading the Firmware of HBA Card," Accessed Apr. 6, 2017, Available Online http://unix.ittoolbox.com/groups/technical-functional/ibm-aix-l/ugrading-the-firmware-of-hba-card-1501854.

IBM-AIX, "How to Upgrade the Adapter's Firmware Level in AIX," Accessed Apr. 6, 2017, Available Online http://howtoaix.blogspot.in/2013/05/how-to-update-firmware-level-in-aix.html.

* cited by examiner

SYSTEM LEVEL UPDATE PROTECTION BASED ON VM PRIORITY IN A MULTI-TENANT CLOUD ENVIRONMENT

BACKGROUND

The present disclosure generally relates to managing system level activities in a multi-tenant cloud environment, and more specifically to techniques for protecting system level updates based on virtual machine (VM) priority in a multi-tenant cloud environment.

In many virtualized cloud environments, physical systems are generally consolidated and shared to provide virtual machines to multiple tenants (e.g., enterprises, such as an individual, organization, company, etc.). These cloud environments can be administered and/or managed by system management software (e.g., such as a hardware management console (HMC)), or other cloud manager software. In addition, multiple administrators may be responsible for maintaining such cloud environments. Having multiple administrators, however, can create complex challenges for managing such cloud environments. For example, with multiple administrators, it can be difficult to manage the cloud environments without impacting the virtual machines, while providing the expected level of service and performance required by the cloud tenants.

With the rapid growth in system technology, many servers today are equipped with multiple sockets (nodes) and non-uniform memory access (NUMA) type architectures. While this is advantageous for large scale clustered applications and cloud environments, such architectures can introduce performance challenges. For example, if VMs are not properly bonded with the right resource affinity, there can be impacts to the overall system performance. Administrators, therefore, typically perform periodic platform optimization across the system to ensure resource affinity and increased performance associated with NUMA architectures. In addition, administrators can also perform several other techniques to ensure that the proper level of service is provided to cloud tenants. Examples of such techniques include, but are not limited to, workload balancing, partition migration, partition hibernation, etc.

However, while these system level operations can, in certain situations, be used to balance and optimize resource use in the system and boost system performance, they can also expose risks to the systems in the cloud environment and to system users at the firmware level. For example, during these system level operations, the firmware can crash and/or experience other problems related to system operation. This can affect the entire system and, in some cases, cause the entire system to go down. As a result, the timing of such operations should be taken into consideration in order to minimize the impact to users. Accordingly, it may be desirable to provide techniques for controlling these system level operations, both at the system management level and tenant (or VM) level.

SUMMARY

One embodiment presented herein includes a method for managing system activities in a cloud computing environment. The method generally includes determining a type of system activity to perform on one or more servers in the cloud computing environment. The method also includes identifying a set of locking parameters available for restricting system activity on the one or more servers. Each locking parameter corresponds to a different type of system activity. The method further includes determining whether to perform the type of system activity based on a value of a locking parameter of the set of locking parameters associated with the type of system activity.

Other embodiments include, without limitation, a computer program product that includes a storage medium having computer-readable program code that enables a processing unit to implement one or more aspects of the disclosed methods as well as a system having a processor, memory, and application programs configured to implement one or more of the disclosed methods.

DETAILED DESCRIPTION

Embodiments presented herein provide techniques for managing system level operations (or activities) based in part on virtual machine (VM) priority in a cloud computing environment. More specifically, embodiments provide techniques for minimizing the impact of system level activities to VMs operating in the cloud environment.

For example, multiple administrators may be responsible for managing and/or maintaining different aspects of a cloud computing environment. As a reference example, a cloud environment may have one or more cloud administrators responsible for maintaining the overall cloud environment and its systems, one or more system administrators responsible for maintaining one or more individual physical systems (e.g., servers) in the cloud environment, and/or one or more VM administrators responsible for maintaining VMs hosted on one or more physical systems in the cloud environment. In such a complex system, operations that are initiated by one administrator at one level/hierarchy may impact operations at other levels in the cloud environment. As a reference example, a firmware update that is applied to servers A and B in the cloud environment may impact operations of VMs hosted on servers A and B. Likewise, in another reference example, operations by VMs hosted on servers A and B may impact the firmware in servers A and B.

Conventional techniques that attempt to account for the timing of such operations (e.g., in order to minimize the impact to users) are generally time consuming, imprecise, and inefficient. For example, these techniques generally involve observing and analyzing the performance behavior of VMs in attempt to find the most suitable time to perform different system level operations. Further, scheduling system level operations in such a manner can be extremely complex when there are several different administrators responsible for managing various systems in the cloud environment. For example, in some cases, it may be possible for system administrators to override VM operations and perform reboot/shutdown/suspend operations. Doing so, however, can cause lateral impact on the VM applications and users since the VM importance may not be fully understood by the HMC or cloud/system administrator. Likewise, in some cases, a system administrator may have to limit the VM administrators from performing firmware impacting operations such as adapter firmware updates, shutdown/reboots, system optimization, etc. The system administrator, however, may not have any method of communicating this to the users, or enforcing it.

As such, embodiments presented herein can configure a management component (on each computing device) with a system activity locking tool (e.g., at the firmware level) that provides protection at different stages of system administration and VM operation in order to minimize impacts to the VMs in the cloud environment. From a VM operating system (OS) level, the VM prioritization can be managed by the VM itself and the VM can use the management component to communicate (via the firmware/hypervisor) their priority for system level operations to the physical systems in the cloud environment. From a system perspective, the cloud administrator(s) or system administrator(s) (via one or more HMCs) can schedule system level operations based on VM priority for system level operations if optimal, or can override a VM's priority for system level operations. In addition, the cloud/system administrators can use their respective management components to limit or lock system level firmware operations being performed by the VM from the OS level.

In one embodiment, the system activity locking tool (of the management component) can be configured with a set of locking array attributes (or parameters) and application programming interfaces (APIs) on firmware that is accessible by cloud administrators, system administrators and VM administrators. Each locking parameter may correspond to a different type of system level activity and may be set to a value that indicates a request to refrain from performing the corresponding system level activity. For example, a first locking parameter (e.g., LOCK_MASTER) can be set to a value that restricts any type of system level activity requested from a user through a service interface (e.g., HMC, operating system of a VM, etc.); a second locking parameter (e.g., LOCK_FW) can be set to a value that restricts firmware update operations; a third locking parameter (e.g., LOCK_MIGRATION) can be set to a value that restricts migration operations; a fourth locking parameter (e.g., LOCK_RESTART) can be set to a value that restricts reboot/shutdowns; and so on.

Additionally, or alternatively, in some embodiments, the locking parameter can include a schedule (or proposed time) for the respective system level activity. Using the LOCK_MIGRATION as a reference example, the management component can send, via LOCK_MIGRATION, a schedule or proposed amount of time for other administrators to refrain from performing a migration procedure. The other administrators, in turn, can use such information to modify operations performed by systems or VMs that they manage.

In some embodiments, the locking parameter (at the firmware level) may be editable by same level/priority and/or higher level/priority administrators. The cloud administrator(s) may have first priority of updating/overriding values of the locking parameters; system (HMC) administrator(s) may have second priority in updating/overriding values of the locking parameters; and VM administrators may have last priority in updating/overriding values of the locking parameters. Those of ordinary skill in the art will recognize that other priority arrangements between administrators can be used.

In one embodiment, the management component can determine a system activity (or operation) to perform on one or more physical servers in the cloud environment. The system activity can be initiated at one or more levels of the cloud environment (e.g., cloud level, system level, VM level, etc.) and can include a firmware update, resource optimization procedure, VM migration procedure, system restart, system shutdown, etc. The management component can identify a set of locking parameters for restricting system activity on the physical server(s) in the cloud environment. As noted, each locking parameter may correspond to a different type of system activity.

The management component can determine whether to perform the system activity based in part on a value of the locking parameter associated with the particular system activity. For example, in some embodiments, the management component may determine the value is set to "YES," indicating a request to refrain performing the system activity. In some embodiments, the management component may determine the value is set to "NO," indicating absence of a request to refrain performing the system activity. Of course, those of ordinary skill in the art will recognize that other values of the locking parameters can be used to indicate whether a particular system level activity is restricted. The value may be set by other administrators in the cloud environment, for example, at the cloud platform level, at the system level (via one or more HMCs) and/or at the VM level. In this manner, the management component can reduce the impact of system activities on VMs operating in the cloud and/or on other operations performed by physical systems in the cloud.

Note embodiments described herein firmware updates, migration procedures, resource optimization procedures, etc., as reference examples of system level operations that can be performed in a cloud computing environment. Those of ordinary skill in the art will readily recognize that the techniques presented herein for protecting VM and physical system operation in a cloud computing environment can in general be applied to other types of system level operations.

Figure 1A:
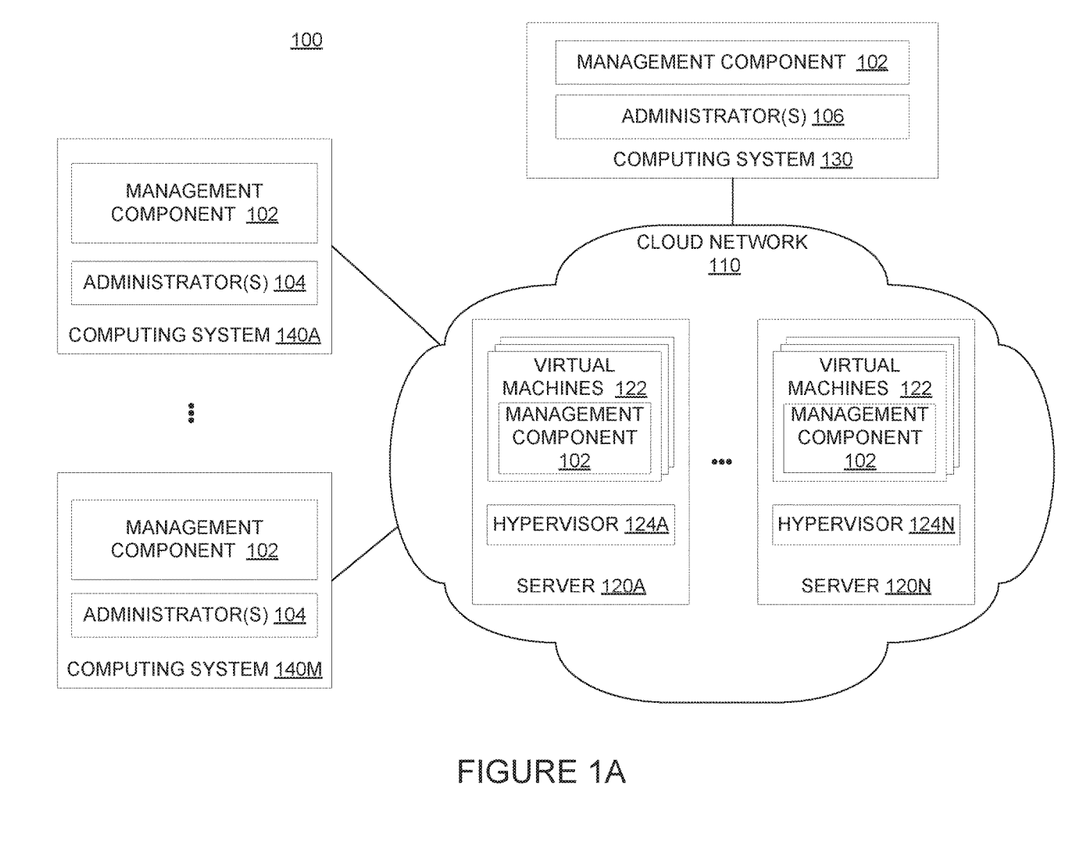
FIGS. 1A-1B illustrate an example computing environment configured to provide protection for system level operations based on VM priority, according to one embodiment.

FIG. 1A illustrates an example of a cloud computing environment 100 configured to manage system level operations (or activities) performed in the cloud computing environment 100, according to one embodiment. As shown, the cloud computing environment 100 includes computing system 130 and computing systems 140A-140M connected to cloud network 110. In one embodiment, the cloud computing environment 100 is an example of a multi-cloud environment with one or more sub-cloud environments (e.g., multiple cloud networks 110). The sub-cloud environments can include Infrastructure-as-a-Service (IaaS) cloud computing environments, Platform-as-a-Service (PaaS) cloud computing environments, Software-as-a-Service (SaaS) cloud computing environments, etc. In one particular embodiment, the cloud computing environment 100 and the cloud network 110 is an IaaS cloud computing environment. Although not shown, computing system 130 and computing systems 140A-140M may be connected to cloud network 110 via a network, which in general may be a telecommunications network, wide area network (WAN), Internet, etc.

Each of the computing systems 130, 140A-M can be any kind of physical computing system having a network interface, such as a desktop computer, laptop computer, mobile device, tablet computer, server computing system, and the like. In one embodiment, each of computing systems 130, 140A-M is a HMC. Each computing system 130, 140A-M includes a management component 102, which is generally configured to perform one or more of the techniques described herein. Management component 102 can be configured to drive and manage cloud network 110. As noted above, there may be multiple administrators at different levels or hierarchies that are responsible for managing and maintaining various aspects of the cloud network 110. Administrator(s) 106, for example, may include cloud administrators that are responsible for managing and maintaining the entire cloud network 110 (including each server 120A-N). Administrators 104, for example, may include system level administrators that are responsible for managing and maintaining one or more individual physical servers 120 in the cloud network 110. In another example, although not shown, each virtual machine (VM) (also referred to as a logical partition (LPAR)) 122 hosted on servers 120 may be managed and maintained by a VM (or LPAR) administrator.

Cloud network 110 includes physical servers 120A-120N. Each server 120 includes one or more VMs 122, management component 102 and a hypervisor 124. Each VM 122 hosted in a given server 120 can run an independent operating system in order to execute one or more applications. Examples of operating systems include versions of the UNIX operating system (such as the AIX operating system), versions of the Microsoft Windows operating system, and distributions of the Linux operating system. (UNIX is a registered trademark of The Open Group in the United States and other countries, or both. Linux is a registered trademark of Linus Torvalds in the United States, other countries, or both). More generally, any operating system supporting the functions disclosed herein may be used. The hypervisor 124 (e.g., firmware layer) is generally an intermediary between the VMs 122 and the hardware in a server 120. The hypervisors 124A-124N can provide each operating system with a set of virtualized computing hardware.

Each administrator (e.g., administrator 106, administrator 104, VM administrator, etc.) can use the management component 102 to manage the various physical servers 120A-N hosting VMs 122 on behalf of tenant(s) in the cloud network 110. For example, the management component 102 can be used to perform system operations, such as software updates, platform optimizations, migration procedures, dynamic resource optimization, etc.

Figure 1B:
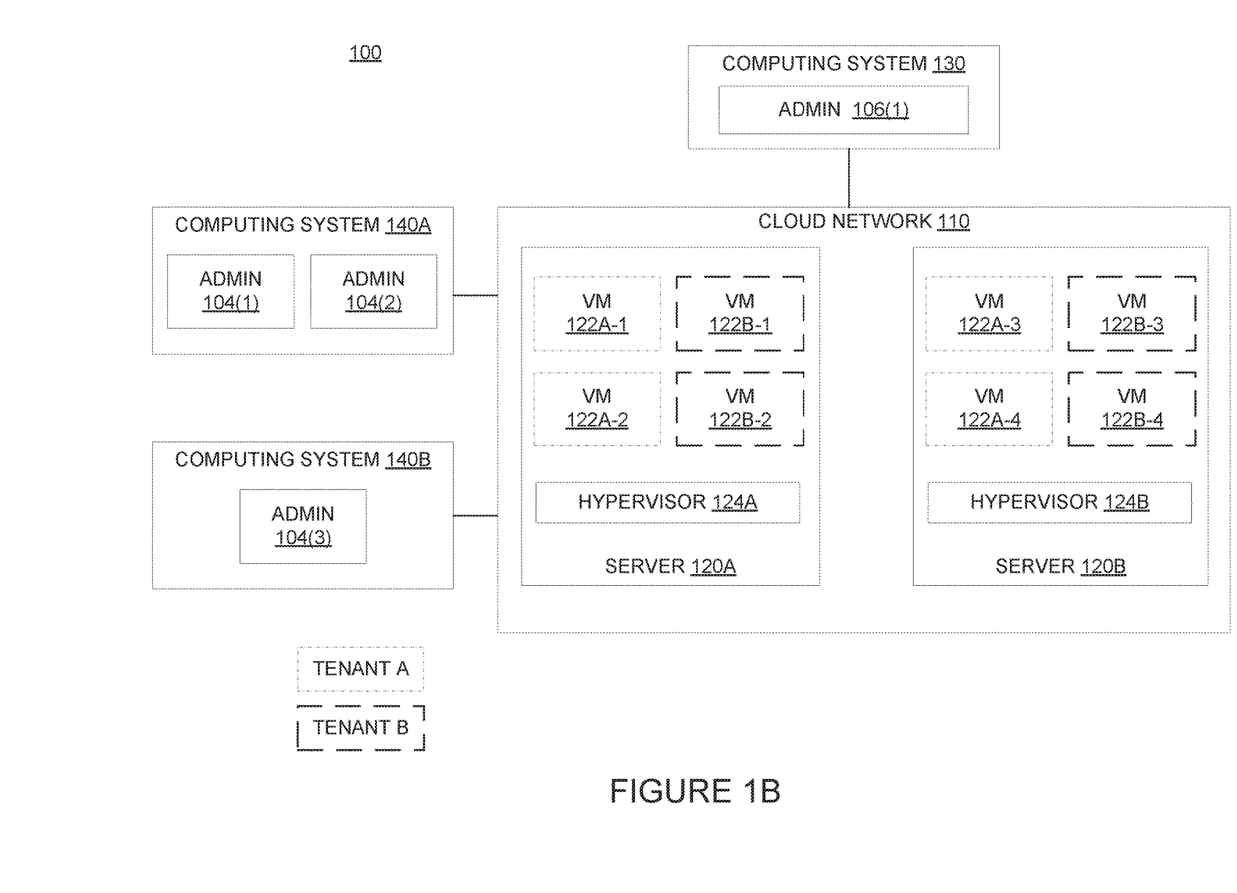

As noted above, in some cases, a system operation that is initiated by an administrator (e.g., administrator 106, administrator 104, VM administrator, etc.) may interfere with or impact operation of VMs 122 hosted on servers 120A-N and/or operations initiated by other administrators. FIG. 1B illustrates one reference example of the cloud computing environment 100 in which multiple administrators are responsible for managing the cloud network 110, according to one embodiment. As shown in FIG. 1B, the cloud computing environment 100 includes a single cloud administrator 106(1) responsible for managing cloud network 110 via computing system 130. Two administrators 104(1), 104(2) are responsible for managing servers 120A and 120B in the cloud network 110 via computing system 140A and another administrator 104(3) is responsible for managing servers 120A and 120B in the cloud network 110 via computing system 140B.

In this particular example, the cloud network 110 includes two physical servers 120A-B, each of which hosts one or more VMs 122A, 122B for two tenants (e.g., tenant A and tenant B). Tenant A's VMs 122A-1, 122A-2 are hosted on server 120A and VMs 122A-3, 122A-4 are hosted on server 120B. Tenant B's VMs 122B-1, 122B-2 are hosted on server 120A and VMs 122B-3, 122B-4 are hosted on server 120B.

Since there are multiple system (HMC) administrators (e.g., administrators 104(1)-(3)), each administrator 104(1)-(3) can perform one or more system level activities (e.g., such as firmware updates, resource optimization, etc.) that may conflict with the operation of the VMs 122. Assume, for example, that computing system (or HMC) 140B or system administrator 104(3) operates on a time zone environment and peak hours for tenant A's VMs 122A are during "X" hours. In this case, system administrator 104(3) may have noticed these peak hours and may have prioritized system level operations for servers 120A-B during "non-X" hours. However, while system administrator 104(3) may attempt to schedule around tenant A's use of VMs 122A, other administrators (e.g., administrators 104(1), 104(2), 106(1), tenant B, etc.) may not have noticed tenant A's peak hours and may attempt to perform system operations during these peak hours. Further, in some cases, even if the other administrators noticed tenant A's peak hours, there is no guarantee that the other administrators will schedule around tenant A's use of VMs 122A.

In other examples, a tenant's use of its VMs can also impact operation of servers and/or administrators in the cloud computing environment 100. For example, assume tenant A is running multiple critical applications via VMs 122A. In some cases, tenant A may not have knowledge of the impact the applications may have on the firmware in servers 120A and 120B. Thus, in certain situations, cloud/system administrators may wish to restrict firmware impacting activities that are performed at the VM level.

To minimize the potential conflicts associated with multiple administrators performing system level operations in a cloud environment, embodiments herein can configure the management component 102 (on each computing system used by an administrator) with a set of locking parameters for restricting system level operations. Using the locking parameters, the management component 102 can consider VM users and/or systems in the cloud network 110 prior to executing any system level activity that could potentially impact their production environment.

In one embodiment, prior to performing a system level activity (e.g., a firmware update), the management component 102 may evaluate whether the locking parameter (e.g., LOCK_FW) associated with the system level activity is set to a value (e.g., "YES") that indicates a request (e.g., from another administrator, HMC, etc.) to refrain from performing the system level activity. The locking parameter (e.g., LOCK_FW) can be set (e.g., via another management component 102) by an administrator from any level of the cloud computing environment 100. For example, the locking parameter can be set by another cloud administrator (e.g., administrator 106(1)), system level administrator (e.g., administrator 104(1)-(3)), VM administrator, etc. A given administrator may set the locking parameter to "YES" if it is determined (e.g., by the other management component 102) that the associated system level activity will impact operation of VMs 122 and/or systems 120 (the administrator is responsible for managing) in the cloud network 110.

For example, with reference to FIG. 1B, assume that tenant A's VMs 122A are running highly critical applications and an affinity policy has been defined from the OS side (e.g., by tenant A) for VMs 122A hosted on servers 120A-B. In such a case, moving or migrating VMs 122A to another server (not shown) may significantly impact the applications running on VMs 122A. Therefore, using the techniques presented herein, tenant A (e.g., VM admin) can indicate its priority for restricting migration activities by setting the value of the locking parameter, LOCK_MIGRATION, to "YES." In some cases, tenant A can also include a schedule via LOCK_MIGRATION indicating the amount of time that the critical applications of tenant A's VMs will run. In another example, assume that administrator 106(1) and/or or one of administrators 104(1)-(3) want to restrict firmware impacting activity from the OS side by tenants A and B. In this example, administrators 106(1), 104(1)-(3) can set the value of the locking parameter, LOCK_MASTER or LOCK_FW, to "YES." Note, that in some embodiments, locking parameters that are set from the operating system side may be advisory to higher level administrators. That is, administrators 106(1), 104(1)-(3) may choose to refrain performing their system level operations based on the values of the locking parameters set by VM administrators or override the values of locking parameters set by VM administrators.

In one embodiment, the management component 102 can determine whether to perform the system level activity based in part on the value of the locking parameter associated with the system level activity. In one embodiment, the management component 102 may determine to perform the system level activity if the value of the locking parameter does not indicate a request to refrain performing the system level activity (e.g., LOCK_SYSTEM ACTIVITY="NO"). In one embodiment, the management component 102 may determine to refrain from (or postpone) performing the system level activity if the value of the locking parameter indicates a request to refrain performing the system level activity (e.g., LOCK_SYSTEM ACTIVITY="YES"). Continuing with the above example, assuming tenant A sets LOCK_MIGRATION="YES," administrators 106(1), 104(1)-(3) can read the value of LOCK_MIGRATION and refrain from performing the migration while LOCK_MIGRATION="YES." Administrators 106(1), 104(1)-(3) may also modify and/or reschedule other operations in order to refrain from performing the migration. In some cases, administrators 106(1), 104(1)-(3) may postpone performing the migration for a predetermined period of time. In the other example above, assuming a cloud/system administrator sets LOCK_FW="YES" to restrict firmware updating activities from the OS side by tenant A, tenant A's VMs 122A can read the value of LOCK_FW and refrain from performing microcode (or firmware) updates while LOCK_FW="YES."

In one embodiment, the management component 102 may choose to still perform the system level activity if the value of the locking parameter indicates a request to refrain performing the system level activity. For example, if the management component 102 determines the locking parameter is set by a VM and/or has a low priority (relative to the priority of the system level activity), the management component 102 can override the value of the locking parameter (e.g., by setting LOCK_SYSTEM ACTIVITY="NO") and perform the system level activity after overriding the locking parameter. Thus, in the example where tenant A sets LOCK_MIGRATION="YES," administrators 106(1), 104(1)-(3) can override the locking parameter by setting LOCK_MIGRATION="NO."

In this manner, the management component 102 provides an efficient mechanism that allows multiple administrators and/or VM users in the cloud computing environment 100 to communicate which system level activities may have an impact on their operation. Doing so can provide protection to VMs and systems in the cloud network 110 from system level activity that potentially impacts VM and system operation. Note FIGS. 1A-1B illustrate reference examples of a cloud computing environment in which the techniques presented herein may be applied. More generally, one of ordinary skill in the art will recognize that the techniques presented herein may also be suited for other embodiments of cloud computing environments.

Figure 2:
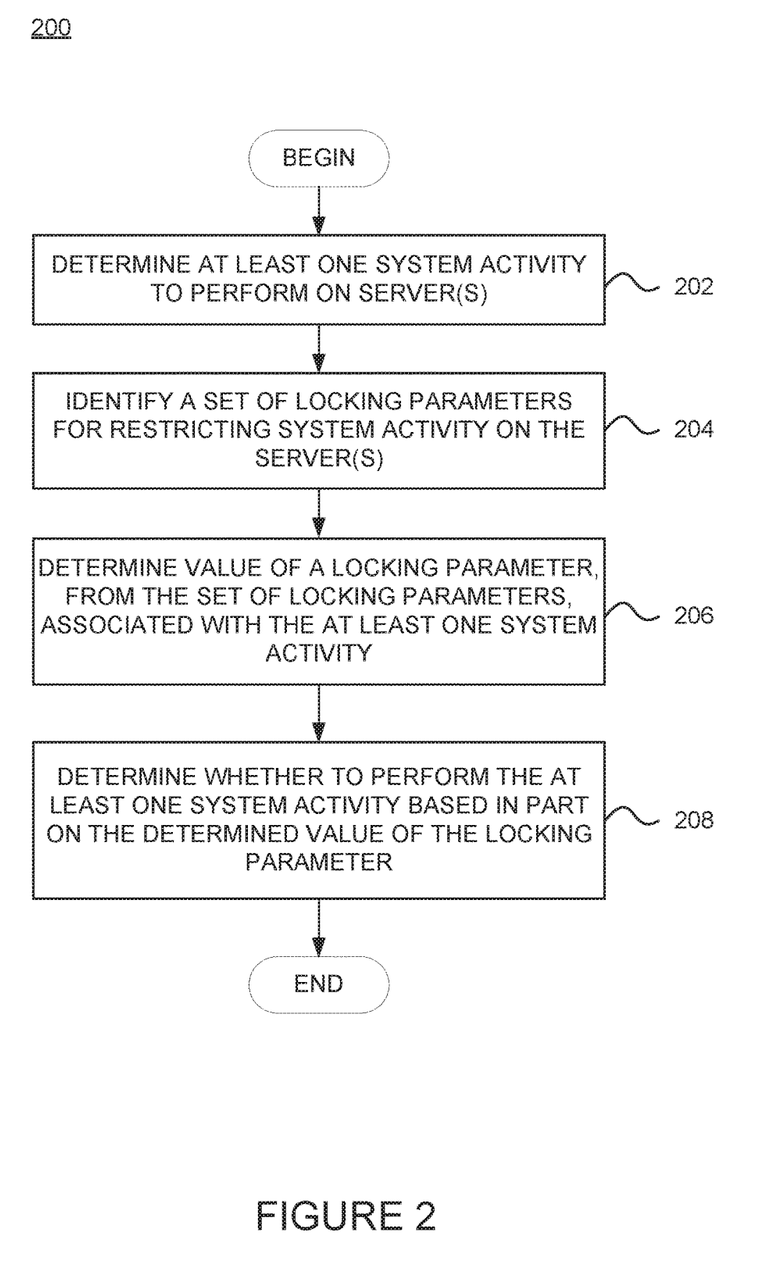
FIG. 2 is a flow chart illustrating a method for managing system activities in a cloud computing environment, according to one embodiment.

FIG. 2 is a flow chart illustrating a method 200 for managing system activities in a cloud computing environment, according to one embodiment. The method 200 may be performed by a management component 102 of a computing system (e.g., computing system 130, 140) and/or VM 122 used by an administrator (e.g., cloud administrator 106, system administrator 104, VM administrator) to manage aspects of the cloud network 110. As shown, the method 200 begins at block 202, where the management component 102 determines at least one system activity to perform on one or more servers (e.g., servers 120). For example, the system activity can include a firmware update, resource optimization procedure, migration procedure, reboot, shutdown, etc. At block 204, the management component 102 identifies a set of locking parameters for restricting system activity on the servers. For example, as noted, the management component 102 can be configured with a set of locking parameters and APIs on firmware that is accessible by cloud administrators, system administrators, VM administrators, etc.

At block 206, the management component 102 determines a value of a locking parameter, from the set of locking parameters, associated with the at least one system activity. For example, the value may be set to "YES," indicating a request for the management component 102 to refrain from performing the system activity, or may be set to "NO," indicating absence of a request for the management component 102 to refrain from performing the system activity. At block 208, the management component 102 determines whether to perform the at least one system activity based in part on the determined value of the locking parameter.

Figure 3:
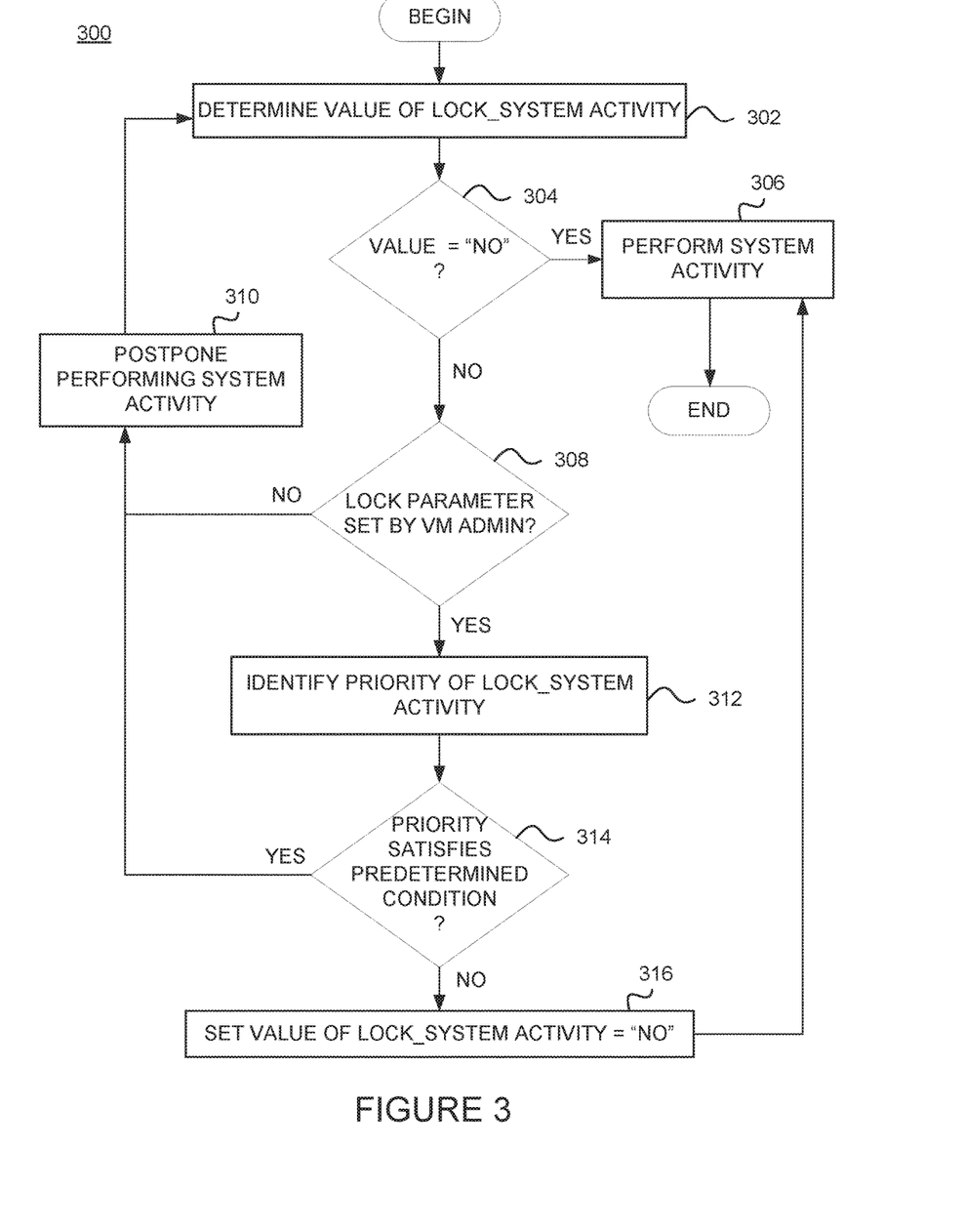
FIG. 3 is a flow chart illustrating a method for performing system activities based on locking parameters, according to one embodiment.

FIG. 3 is a flow chart illustrating a method 300 for performing system activities based on a value of a locking parameter, according to one embodiment. The method 300 may be performed by a management component 102 of a computing system (e.g., computing system 130, 140) and/or VM 122 used by an administrator (e.g., cloud administrator 106, system administrator 104, VM administrator) to manage aspects of the cloud network 110. As shown, the method 300 begins at block 302, where the management component 102 determines the value of the locking parameter (e.g., LOCK_SYSTEM ACTIVITY). At block 304, the management component 102 determines if the value of the locking parameter is set to "NO" (e.g., indicating an absence of a request for the management component 102 to refrain from performing the system activity). If the value is set to "NO," the management component 102 proceeds to perform the system activity (block 306) and the method 300 ends.

On the other hand, if the value is set to "YES," the management component 102 determines whether the locking parameter is set by a VM administrator (block 308). As noted above, the locking parameters set from the OS side (by a VM administrator) may be advisory to higher level administrators (e.g., administrators 104, 106). Thus, in some cases, the higher level administrators can honor the advisory locking parameters from the firmware level and schedule their system level activities around VM priorities. In other cases, the higher level administrators can override the advisory locking parameters and perform the system level operations (e.g., the system level activity associated with the higher level administrator may have a higher priority than the VM's request).

If the locking parameter is set by a VM administrator, the management component 102 identifies the priority of the locking parameter set by the VM (block 312). At block 314, the management component 102 determines if the priority satisfies a predetermined condition. In one embodiment, the predetermined condition may be whether the identified priority is higher than a threshold priority. In one embodiment, the predetermined condition may be whether the VM operation potentially impacted by the planned system level activity has a higher priority than the planned system level activity. If the predetermined condition is satisfied, the management component 102, at block 310, postpones performing the system activity, and returns to block 302. If the predetermined condition is not satisfied, the management component 102 overrides the value of the locking parameter (e.g., by setting LOCK_SYSTEM ACTIVITY="NO") (block 316), and proceeds to perform the system activity (block 306).

If, at block 308, the management component 102 determines the locking parameter is not set by a VM administrator, the management component 102 postpones performing the system activity (block 310) and proceeds to block 302. In some embodiments, however, the management component 102 may still evaluate priority of locking parameters set by same level or higher level administrators, and determine whether to honor the requests or override the requests based on the priority.

As mentioned above, administrators can use management component 102 to set a locking parameter (at the firmware level) requesting other administrators or HMCs to refrain from performing system level activities while the locking parameter is set. However, there may be situations in which an administrator sets a locking parameter and leaves it enabled for the full duration of the running system, preventing other administrators from running system level operations.

Figure 4:
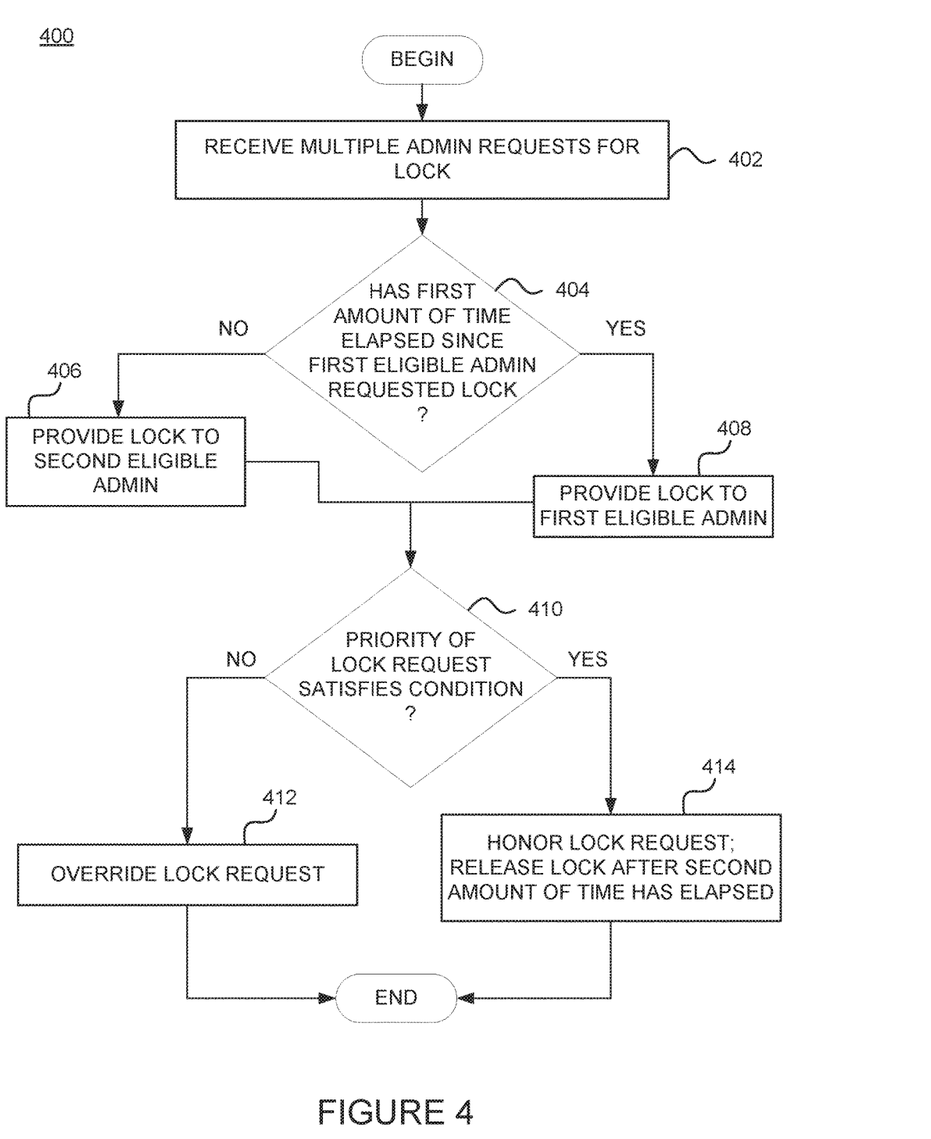
FIG. 4 is a flow chart illustrating a method for managing multiple administrator requests for a locking parameter, according to one embodiment.

FIG. 4 is a flow chart illustrating a method 400 for managing a situation in which multiple administrators attempt to set a value of a locking parameter, according to one embodiment. The method 400 may be performed by a management component 102 of a computing system (e.g., computing system 130, 140) used by an administrator (e.g., cloud administrator 106, system administrator 104) to manage aspects of the cloud network 110. As shown, the method 400 begins at block 402, where the management component 102 receives multiple administrator requests for a locking parameter. In one reference example, cloud administrator 106(1) may receive multiple requests for a lock (e.g., LOCK_FW) from VM administrators. In such cases, the management component 102 may process the requests in a first come, first served manner.

At block 404, the management component 102 determines if a first predetermined amount of time has elapsed since the first eligible administrator requested the lock. If the first amount of time has not elapsed, the management component 102 provides the lock to the second eligible administrator (block 406). The management component 102 may notify the first eligible administrator to wait the remaining amount of time before requesting the lock again. On the other hand, if the first amount of time has elapsed, the management component 102 provides the lock to the first eligible administrator (block 408).

At block 410, the management component 102 determines whether the priority of the lock request (e.g., from either the first/second administrator) satisfies a predetermined condition. In one embodiment, the predetermined condition may be whether the administrator operation potentially impacted by the planned system level activity has a higher priority than the planned system level activity. If the priority associated with the lock request satisfies the predetermined condition, the management component 102 honors the lock request and the lock may be valid for a second predetermined period of time (block 414). After the second predetermined period of time has elapsed, the lock may be automatically released. If the predetermined condition is not satisfied, the management component 102 overrides the lock request (block 412).

Consider one reference example in which the locking parameter being set (e.g., in FIG. 4) is an advisory lock for the rest of the administrators in the cloud computing environment 100. Assume that there are four VM guests running on a server (e.g., server 120), where VM1 performs an application update on the first of every month, VM2's application has peak hours daily between 0000-0002 hours, VM3 has no priority and VM4 performs a database sync weekly at 0009 hours. In this example, the VMs can set their priority based on an individual locking parameter (e.g., LOCK_FW) and/or an overriding common locking parameter (e.g., LOCK_MIGRATION) after a threshold time.

Assuming VM1 sets the LOCK_MIGRATION to "DATE_TIME_DURATION," after the time duration has elapsed (or after a threshold time out of "X" hours), the other VMs can override the lock or higher level administrators can reset the lock to "NULL." Similarly other VMs can set their priority using common lock or individually defined locks to give information to the higher level administrators. If there is a race/conflict between two VMs for a lock, the first VM to request the lock can be honored for "X" hours and the second VM can override the lock after "X" hours. As noted above, higher level administrators can always dishonor the request and proceed with their schedule (e.g., if urgent). Otherwise, higher level administrators can choose to honor the request and postpone their schedule.

Figure 5:
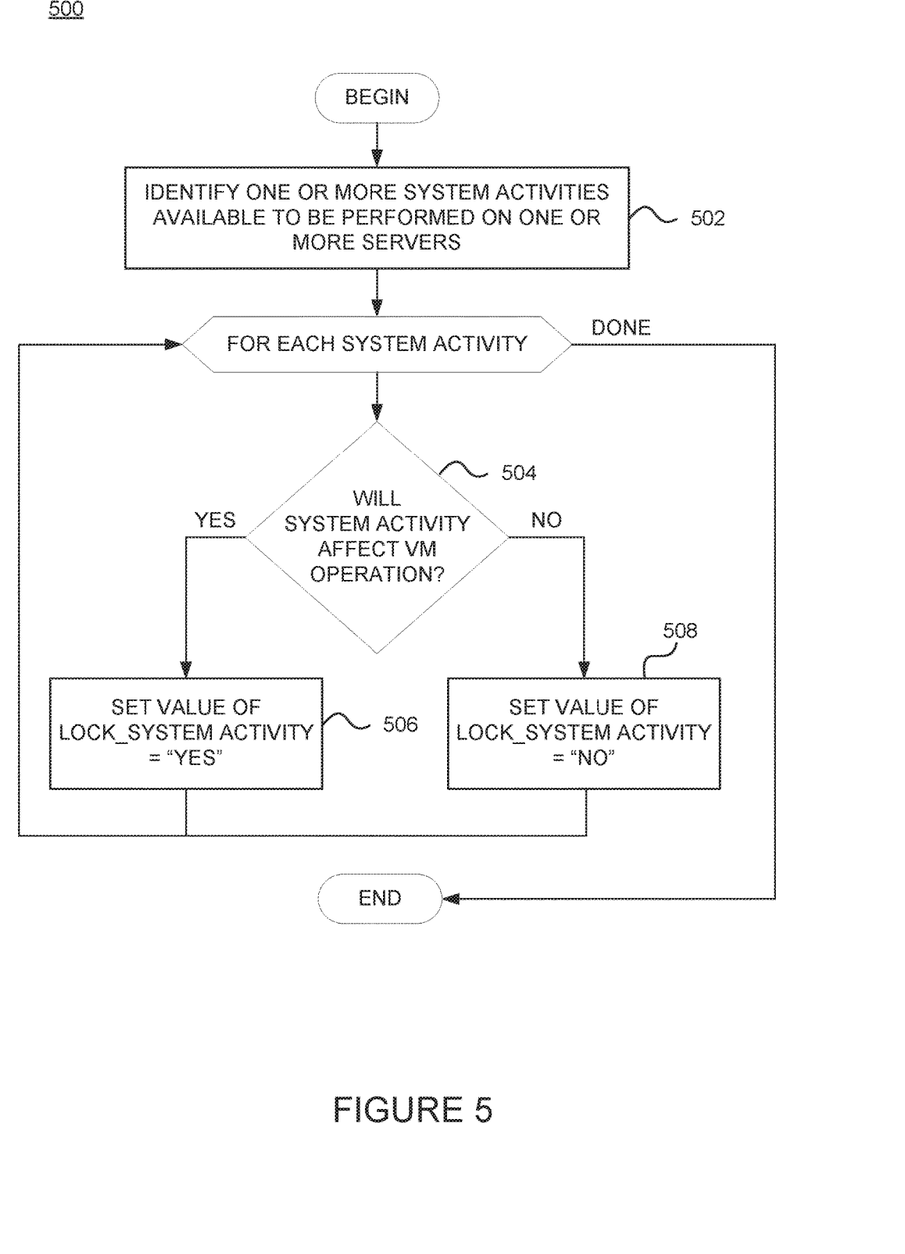
FIG. 5 is a flow chart illustrating a method for setting a value of a locking parameter, according to one embodiment.

FIG. 5 is a flow chart illustrating a method 500 for setting a value of a locking parameter, according to one embodiment. The method 500 may be performed by a management component 102 used by a VM administrator, according to one embodiment. As shown, the method 500 begins at block 502, wherein the management component 102 identifies one or more system activities that are available to be performed on one or more servers in the cloud computing environment. For each system activity, the management component 102 determines if the system activity will affect or impact VM operation (block 504).

If so, the management component 102 sets the value of the locking parameter associated with the system activity to "YES" (block 506). On the other hand, if the system activity will not affect VM operation, the management component 102 sets the value of the locking parameter associated with the system activity to "NO" (block 508). In one embodiment, each VM administrator may be able to set an advisory locking parameter via the hypervisor 124 (e.g., a hypervisor call) and HMC/cloud administrators may honor the VM user's request or override the VM user's request (e.g., depending on priority). By allowing the VMs to set their priority via the locking parameters, the cloud/system administrators can read it from the firmware level and plan their system level activities to reduce potential impact on the VMs.

In one reference example, assume that the system activity is a dynamic resource optimization (DRO) procedure. DRO typically monitors physical systems in order to detect resource imbalances. If resource imbalances are detected, DRO can automatically adjust the resources to balance the load in a cloud environment. In conventional techniques, VMs are generally migrated during DRO operations to a different host to balance the resources. However, in such cases, the cloud/system administrators are generally not able to consider whether the VMs are running critical applications (before taking any migration actions).

Using the locking parameters described herein, a VM administrator can set the locking parameter, LOCK_MIGRATION, to "YES," with the date/time and time out specified. By setting the above locking parameter in this manner, the decision (e.g., by cloud/system administrators) regarding whether to include the VM in the DRO can be more granular (e.g., compared to conventional techniques). That is, the VM administrator, via the locking parameter, can notify the cloud/system administrators as to the VM's usage profile and peak times, which the cloud/system administrators can use to determine if the VM should be excluded from the DRO. For example, if the cloud/system administrators determine (from the locking parameter) there is a chance of the VM's application response being affected or the VM itself going down during the migration, the cloud/system administrators can postpone the DRO operation and/or choose another VM to migrate to another physical system (i.e., not include the potentially affected VM in the migration).

In another reference example, assume the system activity is a dynamic system optimization (DSO). DSO generally provides three types of optimization, cache and memory affinity, large page optimization, and data stream pre-fetch optimization. Using the techniques described herein, a VM administrator can set a locking parameter corresponding to the DSO (e.g., LOCK_DSO) to notify cloud/system administrators to restrict further DSO procedures on resources used by VMs (managed by the VM administrator). The VM administrator may do so in situations where the VMs' level of performance is greater than a predefined threshold. Otherwise, if the locking parameter was not set, there is a chance that the cloud/system administrators could re-arrange resources used by the VMs in DSO operations that are performed on behalf of another VM. Therefore, by setting the locking parameter, LOCK_DSO, in this manner, the VM administrators can request cloud/system administrators to not touch resources belonging to the VM in any DSO operations. While DSO was used in this example as an example of a system activity, a similar procedure may apply for migration procedures.

Figure 6:
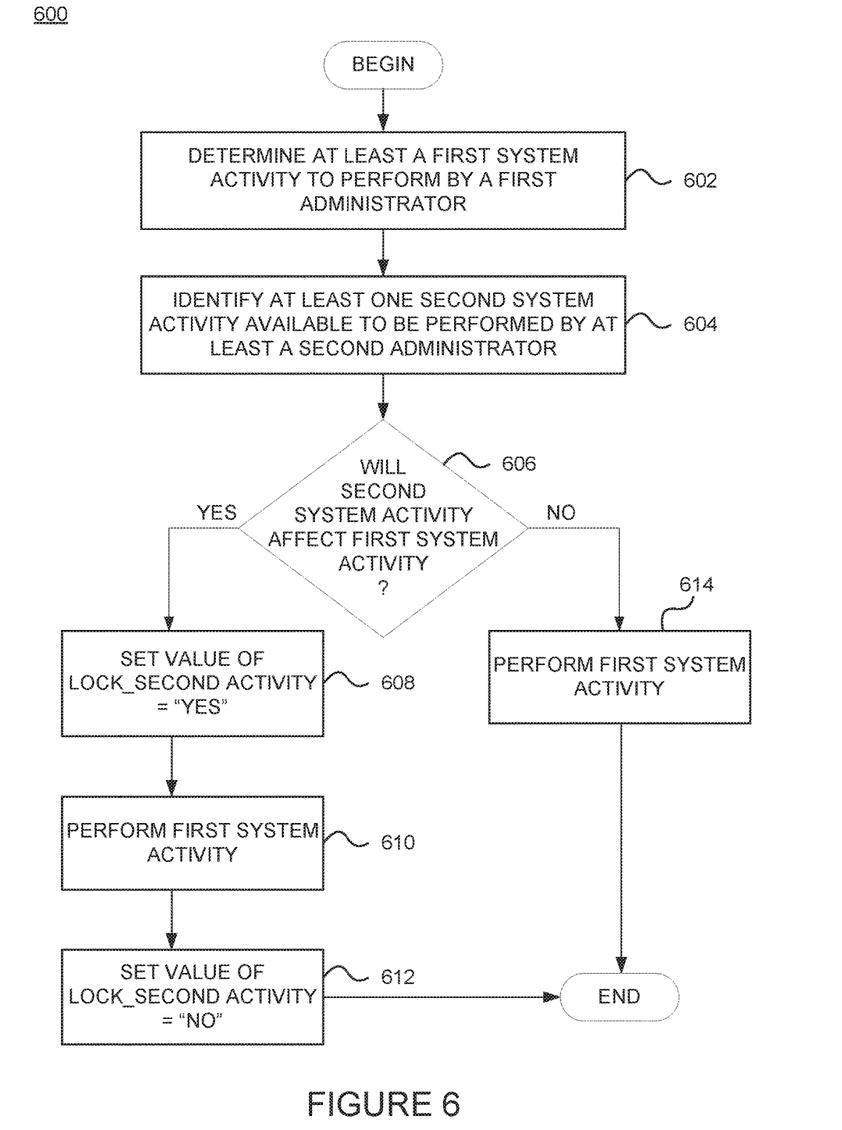
FIG. 6 is a flow chart illustrating another method for setting a value of a locking parameter, according to one embodiment.

FIG. 6 is a flow chart illustrating a method 600 for setting a value of a locking parameter, according to one embodiment. The method 600 may be performed by a management component 102 of a computing system (e.g., computing system 130, 140) used by an administrator (e.g., cloud administrator 106, system administrator 104) to manage aspects of the cloud network 110. The method 600 begins at block 602, where the management component 102 determines at least a first system activity to perform by a first administrator (e.g., administrator 106). At block 604, the management component 102 identifies at least one second system activity available to be performed by at least a second administrator (e.g., administrator 104).

At block 606, the management component 102 determines whether the second system activity will have an impact on the first system activity. If so, the management component 102 sets the value of the locking parameter associated with the second system activity to "YES" (block 608), performs the first system activity (block 610), sets the value of the locking parameter associated with the second system activity to "NO" (block 612), and the method ends. If the second system activity will not have an impact on the first system activity, the management component 102 performs the first system activity (block 614), and the method ends. Advantageously, by providing a mechanism at the firmware level that allows administrators to set locking parameters to restrict system level activities by other administrators, the administrators can reduce the chances of VMs being affected during system level operations.

Assume, for example, that the first system activity is a firmware update initiated by a cloud/system administrator and the second system activity is a microcode update for hardware components (e.g., host bus adapter (HBA), or other adapters) initiated by a VM administrator. It is generally advisable not to conduct firmware updates of a physical system together with microcode updates of one or more local attached devices. Accordingly, in such situations, the cloud/system administrator can set a locking parameter, LOCK_ADAPTER, to request that the VM administrator refrain from initiating any microcode updates for hardware components while the cloud/system administrator is performing a firmware update. In this manner, the cloud/system administrator can ensure that there are no conflicts between system firmware updates and system activities initiated from the OS side.

In another reference example, assume that the first system activity is a disruptive firmware update that has to be applied to a physical server 120 in the cloud network 110, and that the second system activity is a critical application being run by a VM 122. Generally, during a disruptive firmware update, the platform (of the server 120) must be in initial program load for any fixes (e.g., to firmware, memory, hardware, etc.) in the server 120 to take effect. To do this, the system administrator typically has to set the host server to maintenance mode and the VMs (on the host server) have to be evacuated/migrated to a different physical server prior to the maintenance. To minimize the impact, there should be a scheduled outage on the VMs. However, in a cloud environment, there may be an increased likelihood of a VM getting impacted during the movement if the system administrator does not take the scheduled outage at the appropriate time.

In such situations, in accordance with the techniques presented herein, the system administrator can broadcast the schedule (for proposed VM outage) via a locking parameter (e.g., LOCK_FWUPDATE). The VMs, in turn, on the host server can proactively shift their application queries to redundant servers. The applications interaction is proactive here rather than reactive. The locking parameter, LOCK_FWUPDATE, acts as an advisory lock for the rest of the system administrators. If any of the other system administrators have to override the schedule (e.g., based on priority), those system administrators can override the locking parameter. In this manner, the system administrator can give relevant information regarding its schedule to each administrator in the cloud computing environment.

In another reference example, assume that the system activity (e.g., first system activity) is a concurrent firmware update. In concurrent firmware maintenance, administrators generally have the ability to activate firmware updates on a running system without rebooting or evacuating partitions or perturbing applications. That is, in concurrent firmware maintenance, a system outage is not required to update firmware. In current techniques, however, if a cloud/system administrator performs a concurrent update and the VM users are unaware of the plan, the VM users may be running critical applications while the concurrent update is being performed. In such cases, there is a risk that the entire system can go down.

However, if the system administrator broadcasts the maintenance information via the LOCK_FWUPDATE parameter, the VM clients can prioritize or shift their applications to other redundant physical systems (such that the concurrent firmware maintenance does not affect VM operation). Once the system administrator completes the maintenance and resets the LOCK_FWUPDATE parameter, the VM administrators can reposition the critical applications back to the original system and normal operation can be resumed. Thus, in this example, the system administrator does not migrate the VMs to another system, but rather informs the VMs that there is a potential risk coming so that the VM administrators can plan accordingly. Setting the LOCK_FWUPDATE parameter can also alert the other cloud/system administrators about the schedule such that the other cloud/system administrators can avoid integrating or deploying additional VMs during the scheduled maintenance.

In another reference example, assume that the same physical server is managed by multiple HMCs (e.g., two system administrators). Such a situation may occur, for example, in testing and development environments in which there are often multiple people (or teams) using and performing operations on the same system. In these cases, the locking parameters can be used to synchronize operations by different administrators on the same server, and reduce conflicts.

Figure 7:
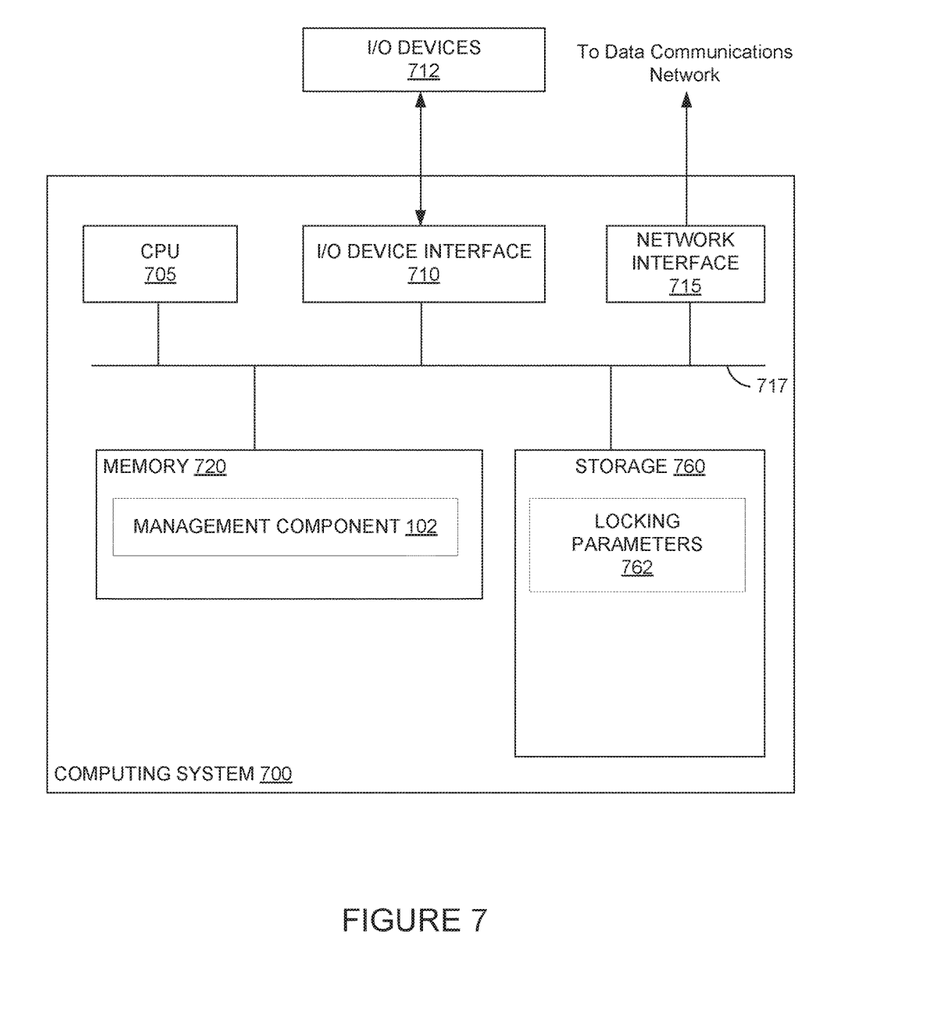
FIG. 7 is a block diagram illustrating a computing system configured to manage system activities in a cloud computing environment, according to one embodiment.

FIG. 7 illustrates a computing system 700 configured to manage system activities in a cloud computing environment, according to one embodiment. As shown, the computing system 700 includes, without limitation, a central processing unit (CPU) 705, a network interface 715, a memory 720, and storage 760, each connected to a bus 717. The computing system 700 may also include an I/O device interface 710 connecting I/o devices 712 (e.g., keyboard, mouse, and display devices) to the computing system 700. Further, in context of this disclosure, the computing elements shown in the computing system 700 may correspond to a physical computing system (e.g., a system in a data center) or may be a virtual computing instance executing within a computing cloud. In one embodiment, the computing system 700 can be an example of the computing systems illustrated in FIGS. 1A-1B (e.g., computing systems 130, computing systems 140A-140M, etc.).

The CPU 705 retrieves and executes programming instructions stored in the memory 720 as well as stores and retrieves application data residing in the memory 720. The interconnect 717 is used to transmit programming instructions and application data between CPU 705, I/O devices interface 710, storage 760, network interface 715, and memory 720. Note CPU 705 is included to be representative of a single CPU, multiple CPUs, a single CPU having multiple processing cores, and the like. Memory 720 is generally included to be representative of a random access memory. The storage 760 may be a disk drive storage device. Although shown as a single unit, storage 760 may be a combination of fixed and/or removable storage devices, such as fixed disc drives, removable memory cards, or optical storage, network attached storage (NAS), or a storage area-network (SAN). The storage 760 includes locking parameters 762. Illustratively, the memory 720 includes a management component 102, which is described in more detail above.

Advantageously, using the management component to set a prioritization status at the firmware level can provide a method for safer administration and reduced risk of maintenance activities impacting the virtual machines and user. Further, by providing an interface to communicate job priority and/or scheduling of maintenance activities, cloud tenants can have more control over the activities that may impact the operation and/or performance of their VMs.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., management component 102, etc.) or related data available in the cloud. For example, the management component 102 could execute on a computing system in the cloud, and manage system level activities based on one or more locking parameters. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer-implemented method for managing system activities in a cloud computing environment, comprising:
    determining a type of system activity to perform on one or more servers in the cloud computing environment;
    identifying a set of locking parameters at a plurality of hierarchal levels of the cloud computing environment available for restricting system activity on the one or more servers, wherein each locking parameter corresponds to a different type of system activity and is associated with a particular hierarchal level of the plurality of hierarchal levels;
    determining whether to perform the type of system activity based on a value of a locking parameter of the set of locking parameters that is associated with the type of system activity, the particular hierarchal level of the plurality of hierarchal levels associated with the locking parameter of the set of locking parameters, and a priority associated with the type of system activity; and
    performing the type of system activity after determining to perform the type of system activity.

2. The computer-implemented method of claim 1, wherein the value of the locking parameter is set by a virtual machine (VM) hosted on one of the one or more servers.

3. The computer-implemented method of claim 2, wherein the VM expects the type of system activity to affect at least one of resources used by the VM, performance of the VM, and one or more workloads of the VM.

4. The computer-implemented method of claim 2, wherein performing the type of system activity comprises, upon determining that the value of the locking parameter indicates a request from the VM to refrain from performing the type of system activity:
    postponing the type of system activity for a period of time; or
    refraining from performing the type of system activity while the value of the locking parameter indicates the request to refrain from performing the type of system activity.

5. The computer-implemented method of claim 2, wherein performing the type of system activity comprises, upon determining that the value of the locking parameter indicates a request from the VM to refrain from performing the type of system activity:
    overriding the value of the locking parameter; and
    performing the type of system activity after overriding the value of the locking parameter.

6. The computer-implemented method of claim 2, wherein performing the type of system activity comprises performing the type of system activity upon determining that the value of the locking parameter does not indicate a request from the VM to refrain performing the type of system activity.

7. The computer-implemented method of claim 1, wherein the value of the locking parameter is set by at least one administrator of the one or more servers in the cloud computing environment.

8. The computer-implemented method of claim 7, wherein performing the type of system activity comprises, upon determining that the value of the locking parameter indicates a request from the at least one administrator to refrain from performing the type of system activity, refraining from performing the type of system activity while the value of the locking parameter indicates the request to refrain performing the type of system activity.

9. The computer-implemented method of claim 1, wherein the type of system activity is determined from a plurality of system activities, and wherein the plurality of system activities comprise at least one of a firmware update, resource optimization procedure, virtual machine (VM) migration, restart of the one or more servers, and shutdown of the one or more servers.

10. A system, comprising:
    a processor; and
    a memory storing one or more instructions which, when executed by the processor, perform an operation for managing system activities in a cloud computing environment, the operation comprising:
        determining a type of system activity to perform on one or more servers in the cloud computing environment;
        identifying a set of locking parameters at a plurality of hierarchal levels of the cloud computing environment available for restricting system activity on the one or more servers, wherein each locking parameter corresponds to a different type of system activity and is associated with a particular hierarchal level of the plurality of hierarchal levels;
        determining whether to perform the type of system activity based on a value of a locking parameter of the set of locking parameters that is associated with the type of system activity, the particular hierarchal level of the plurality of hierarchal levels associated with the locking parameter of the set of locking parameters, and a priority associated with the type of system activity; and
        performing the type of system activity after determining to perform the type of system activity.

11. The system of claim 10, wherein the value of the locking parameter is set by a virtual machine (VM) hosted on one of the one or more servers.

12. The system of claim 11, wherein performing the type of system activity comprises, upon determining that the value of the locking parameter indicates a request from the VM to refrain from performing the type of system activity:
    postponing the type of system activity for a period of time; or
    refraining from performing the type of system activity while the value of the locking parameter indicates the request to refrain from performing the type of system activity.

13. The system of claim 11, wherein performing the type of system activity comprises, upon determining that the value of the locking parameter indicates a request from the VM to refrain from performing the type of system activity:
    overriding the value of the locking parameter; and
    performing the type of system activity after overriding the value of the locking parameter.

14. The system of claim 11, wherein the VM expects the type of system activity to affect at least one of resources used by the VM, performance of the VM, and one or more workloads of the VM.

15. The system of claim 10, wherein performing the type of system activity comprises, upon determining that the value of the locking parameter indicates a request, from at least one administrator of the one or more servers in the cloud computing environment, to refrain from performing the type of system activity, refraining from performing the type of system activity while the value of the locking parameter indicates the request to refrain performing the type of system activity.

16. A computer program product, comprising:
a computer-readable storage medium having computer-readable program code embodied therewith, the computer-readable program code executable by one or more computer processors to perform an operation for managing system activities in a cloud computing environment, the operation comprising:
determining a type of system activity to perform on one or more servers in the cloud computing environment;
identifying a set of locking parameters at a plurality of hierarchal levels of the cloud computing environment available for restricting system activity on the one or more servers, wherein each locking parameter corresponds to a different type of system activity and is associated with a particular hierarchal level of the plurality of hierarchal levels;
determining whether to perform the type of system activity based on a value of a locking parameter of the set of locking parameters that is associated with the type of system activity, the particular hierarchal level of the plurality of hierarchal levels associated with the locking parameter of the set of locking parameters, and a priority associated with the type of system activity; and
performing the type of system activity after determining to perform the type of system activity.

17. The computer program product of claim 16, wherein the value of the locking parameter is set by a virtual machine (VM) hosted on one of the one or more servers, and wherein the VM expects the type of system activity to affect at least one of resources used by the VM, performance of the VM, and one or more workloads of the VM.

18. The computer program product of claim 17, wherein performing the type of system activity comprises, upon determining that the value of the locking parameter indicates a request from the VM to refrain from performing the type of system activity:
postponing the type of system activity for a period of time; or
refraining from performing the type of system activity while the value of the locking parameter indicates the request to refrain from performing the type of system activity.

19. The computer program product of claim 17, wherein performing the type of system activity comprises, upon determining that the value of the locking parameter indicates a request from the VM to refrain from performing the type of system activity:
overriding the value of the locking parameter; and
performing the type of system activity after overriding the value of the locking parameter.

20. The computer program product of claim 16, wherein performing the type of system activity comprises upon determining that the value of the locking parameter indicates a request, from at least one administrator of the one or more servers in the cloud computing environment, to refrain from performing the type of system activity, refraining from performing the type of system activity while the value of the locking parameter indicates the request to refrain performing the type of system activity.

* * * * *